(12) United States Patent  (10) Patent No.: US 9,200,772 B1
Long  (45) Date of Patent: Dec. 1, 2015

(54) AD-NIGHT LIGHTING SYSTEM

(71) Applicant: Stuart John Long, Largo, FL (US)

(72) Inventor: Stuart John Long, Largo, FL (US)

( * ) Notice: Subject to any disclaimer, the term of this patent is extended or adjusted under 35 U.S.C. 154(b) by 205 days.

(21) Appl. No.: 14/154,508

(22) Filed: Jan. 14, 2014

Related U.S. Application Data

(60) Provisional application No. 61/770,071, filed on Feb. 27, 2013.

(51) Int. Cl.
  *F21V 7/04* (2006.01)
  *F21S 8/10* (2006.01)
(52) U.S. Cl.
  CPC ....................................... *F21S 48/00* (2013.01)
(58) Field of Classification Search
  CPC .......... F21S 48/00; G09F 21/00; G09F 21/04; G09F 21/041; G09F 21/048; G09F 2013/044; G09F 2013/0463
  USPC .............................. 362/549, 249.02, 486, 812
  See application file for complete search history.

(56) References Cited

U.S. PATENT DOCUMENTS

| 3,305,961 | A  | * | 2/1967 | Lanzon | .................... | G09F 21/04 362/486 |
| 6,598,327 | B1 | * | 7/2003 | Strzeletz | ................. | G09F 21/04 40/558 |
| 2006/0164827 | A1 | * | 7/2006 | Minewiser | .............. | F21S 9/037 362/183 |
| 2008/0247852 | A1 | * | 10/2008 | Graham | ................. | B60J 5/0498 414/483 |
| 2010/0043264 | A1 | * | 2/2010 | Johnson, Jr. | ........... | G06Q 30/02 40/559 |
| 2011/0277792 | A1 | * | 11/2011 | Turner | ...................... | B60S 3/04 134/18 |

* cited by examiner

*Primary Examiner* — Ali Alavi

(57) ABSTRACT

A support assembly on each side of a vehicle includes a plurality of first brackets interiorly, a plurality of second bracket exteriorly, and an intermediate leg between an associated first bracket and second bracket. Each intermediate leg has a short vertical extent positioned adjacent to an associated first bracket and has a long angled extent extending outwardly and downwardly from an associated first bracket. Each long angled extent is positioned adjacent to an associated second bracket. The first brackets receive an associated lateral projection and the second brackets receive and support lamps.

4 Claims, 3 Drawing Sheets

AD-NIGHT LIGHTING SYSTEM

RELATED APPLICATION

This application is based upon and claims priority of Provisional Application Ser. No. 61/770,071 filed Feb. 27, 2013, the subject matter of which is incorporated herein by reference.

BACKGROUND OF THE INVENTION

1. Field of the Invention

The present invention relates to an ad-night lighting system and more particularly pertains to illuminating advertising indicia located on the side of a vehicle while driving and while parked and for also illuminating the interior of the vehicle, the illuminating being done in a safe, convenient and economical manner.

2. Description of the Prior Art

The use of vehicle advertising lighting systems of known designs and configurations is known in the prior art. More specifically, vehicle advertising lighting systems of known designs and configurations previously devised and utilized for the purpose of illuminating advertising indicia on vehicles are known to consist basically of familiar, expected, and obvious structural configurations, notwithstanding the myriad of designs encompassed by the crowded prior art which has been developed for the fulfillment of countless objectives and requirements.

While these devices fulfill their respective, particular objectives and requirements, the aforementioned patents do not describe an ad-night lighting system that allows illuminating advertising indicia located on the side of a vehicle while driving and while parked and for also illuminating the interior of the vehicle, the illuminating being done in a safe, convenient and economical manner.

In this respect, the ad-night lighting system according to the present invention substantially departs from the conventional concepts and designs of the prior art, and in doing so provides an apparatus primarily developed for the purpose of illuminating advertising indicia located on the side of a vehicle while driving and while parked and for also illuminating the interior of the vehicle, the illuminating being done in a safe, convenient and economical manner.

Therefore, it can be appreciated that there exists a continuing need for a new and improved ad-night lighting system which can be used for illuminating advertising indicia located on the side of a vehicle while driving and while parked and for also illuminating the interior of the vehicle, the illuminating being done in a safe, convenient and economical manner. In this regard, the present invention substantially fulfills this need.

SUMMARY OF THE INVENTION

In view of the disadvantages inherent in the known types of vehicle advertising lighting systems of known designs and configurations now present in the prior art, the present invention provides an improved ad-night lighting system. As such, the general purpose of the present invention, which will be described subsequently in greater detail, is to provide a new and improved ad-night lighting system and method which has all the advantages of the prior art and none of the disadvantages.

To attain this, the present invention essentially comprises a support assembly on each side of a vehicle. Each support assembly includes a plurality of first brackets interiorly and a plurality of second brackets exteriorly and an intermediate leg between an associated first bracket and second bracket. Each intermediate leg has a short vertical extent positioned adjacent to an associated first bracket. Each intermediate leg has a long angled extent extending outwardly and downwardly from an associated first bracket. Each long angled extent is positioned adjacent to an associated second bracket. The first brackets receive an associated lateral projection. The second brackets receive and support lamps. Such components are individually configured and correlated with respect to each other so as to attain the desired objective.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the invention be regarded as including such equivalent constructions insofar as they do not depart from the spirit and scope of the present invention.

It is therefore an object of the present invention so provide a new and improved ad-night lighting system which has all of the advantages of the prior art lighting systems for vehicles of known designs and configurations and none of the disadvantages.

It is another object of the present invention to provide a new and improved ad-night lighting system which may be easily and efficiently manufactured and marketed.

It is a further object of the present invention to provide a new and improved ad-night lighting system which is of durable and reliable constructions.

An even further object of the present invention is to provide a new and improved ad-night lighting system which is susceptible of a low cost of manufacture with regard to both materials and labor, and which accordingly is then susceptible of low prices of sale to the consuming public, thereby making such ad-night lighting system economically available to the buying public.

Lastly, it is an object of the present invention is to provide a new and improved ad-night lighting system which can be used for illuminating advertising indicia located on the side of a vehicle while driving and while parked and also for illuminating the interior of the vehicle, the illuminating being done in a safe, convenient and economical manner.

These together with other objects of the invention, along with the various features of novelty which characterize the invention, are pointed out with particularity in the claims annexed to and forming a part of this disclosure.

For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various Figures.

DESCRIPTION OF THE PREFERRED EMBODIMENT

Figure 1:
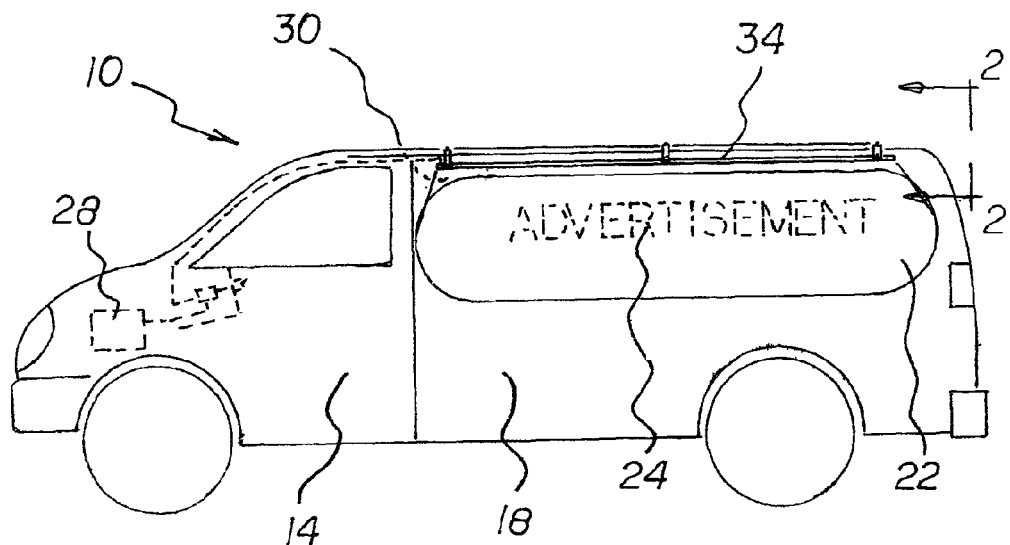
FIG. 1 is a side elevational view of an ad-night lighting system constructed in accordance with the principles of the present invention.
Figure 2:
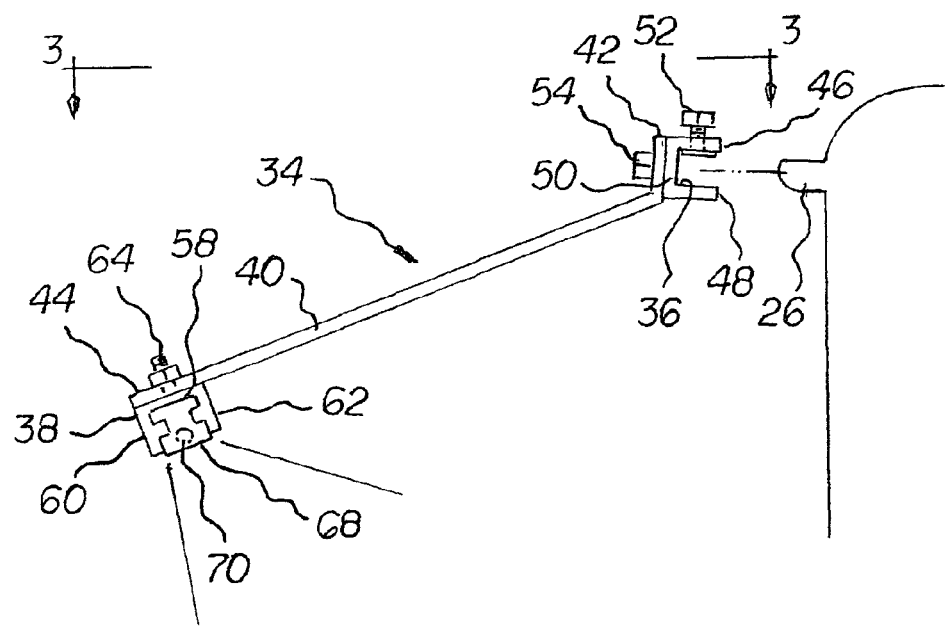
FIG. 2 is an exploded rear elevational of the system taken along line 2-2 of FIG. 1.
Figure 3:
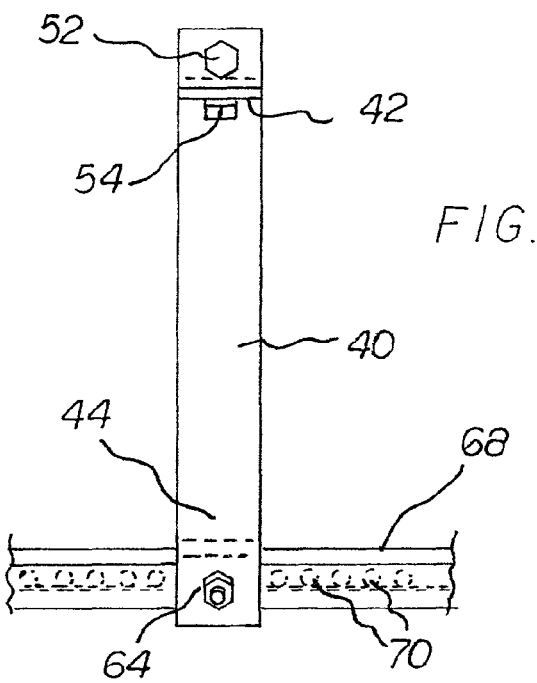
FIG. 3 is a plan view of a portion of the system taken along line 3-3 of FIG. 2.

With reference now to the drawings, and in particular to FIG. 1 thereof, the preferred embodiment of the new and improved ad-night lighting system embodying the principles and concepts of the present invention and generally designated by the reference numeral 10 will be described.

The present invention, the ad-night lighting system 10 is comprised of a plurality of components. Such components in their broadest context include support assemblies on each side of a vehicle. Such components are individually configured and correlated with respect to each other so as to attain the desired objective.

Figure 4:
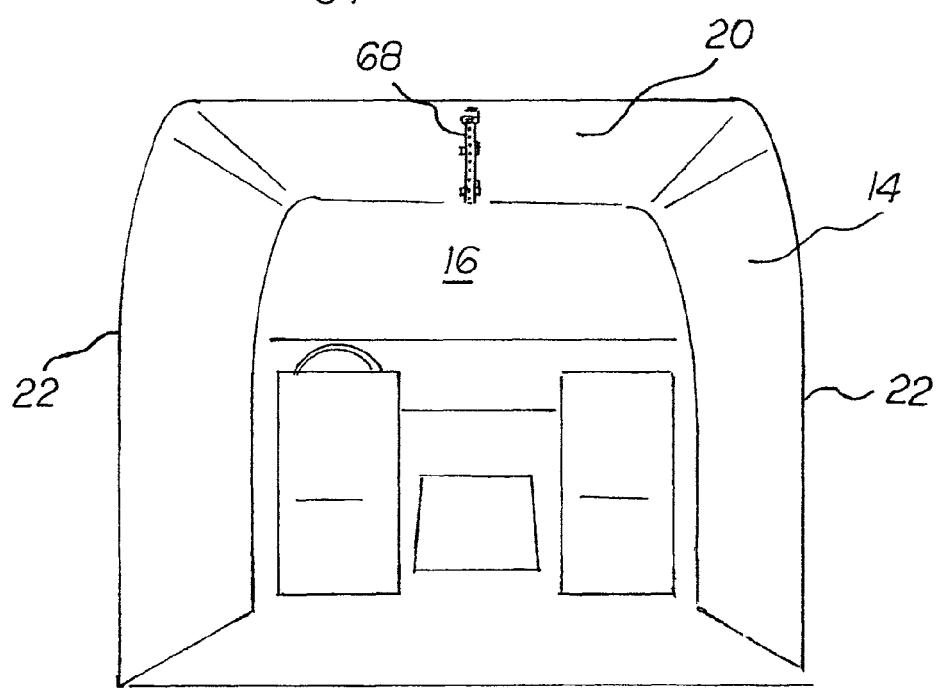
FIG. 4 is a rear elevational view of the system taken with the rear doors open.
Figure 5:
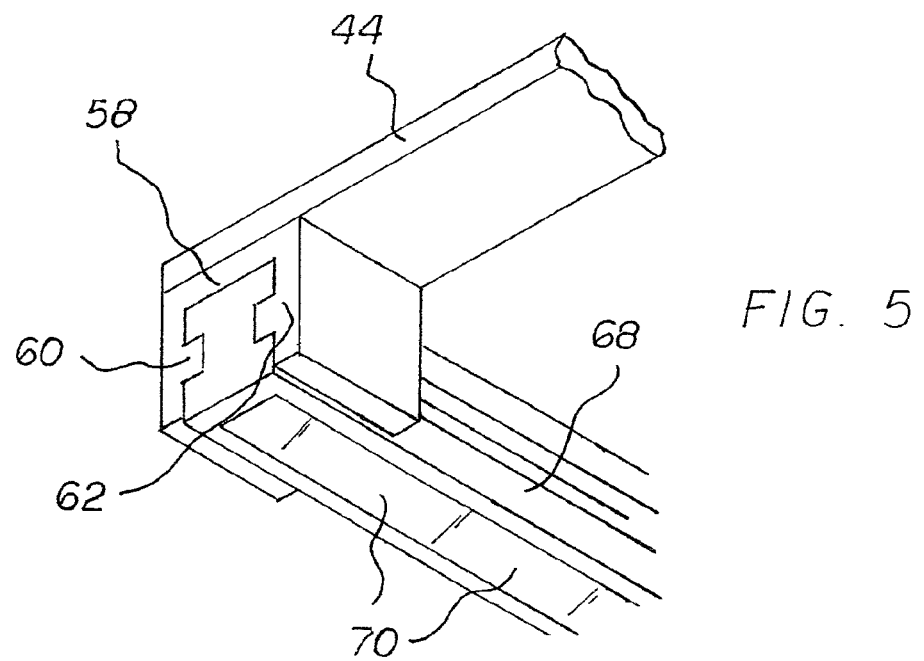
FIG. 5 is a perspective illustration of the coupling between a support assembly and a lamp shown in FIGS. 1-3 and 5.

In the preferred embodiment of the ad-night lighting system, designated by reference numeral 10, first provided is a vehicle 14. The vehicle provided may include busses, custom vans, service vans, 18-wheelers and semi-trucks. The vehicle has an interior 16 and an exterior 18. The interior has a storage area with a ceiling 20. Note FIG. 4. The exterior has two opposed side panels 22 with advertising indicia 24 thereon. The advertising indicia is adapted to be written on the side panels or on a separate member permanently or magnetically coupled to the side panels. The vehicle also has a top, a front forwardly, and a rear rearwardly. A mid-length location of the vehicle is equally spaced between the front and the rear. The exterior also has a lateral projection 26 on each side of the vehicle adjacent to the top and extending forwardly from the rear of the vehicle adjacent to the top to a location forwardly of the mid-length location. A source of electrical potential is provided. The sources of electrical potential include a car battery 28 within the vehicle and a solar panel 30 on the top of the vehicle.

Next provided are three support assemblies 34 on each side of the vehicle. Each support assembly includes a first bracket 36 interiorly, a second bracket 38 exteriorly, and an intermediate leg 40 coupling associated first and second brackets. Each intermediate leg has a short vertical extent 42 positioned adjacent to an associated first bracket. Each intermediate leg has a long angled extent 44 extending outwardly and downwardly from an associated first bracket at between 10 degrees and 20 degrees from the horizontal.

Each first bracket has a C-shaped configuration with a horizontal upper segment 46, a lower segment 48, and an intermediate segment 50. Each first bracket receives a portion of an associated lateral projection. A first threaded aperture extends through each upper segment with a primary bolt 52 extending through an associated first threaded aperture for separably coupling each support assembly to an associated lateral projection. A second threaded aperture extends through each intermediate segment and associated short extent of the intermediate leg. A secondary bolt 54 extends through each second threaded aperture for separably coupling each intermediate leg to an associated first bracket.

Each second bracket has a generally inverted U-shaped configuration with a generally horizontal top segment 58 and parallel lower segments 60, 62 forming a contoured slot. A third threaded aperture extends through each top segment and long extent of the intermediate leg. A tertiary bolt 64 extends through each third threaded aperture and intermediate leg for separably coupling each second bracket to an associated intermediate leg.

Next provided is a lamp 68 positioned on each side of the vehicle. Each lamp has an elongated configuration. Each lamp has a rearward part supported by a rearward support assembly adjacent to the rear of the vehicle. Each lamp has a forward part supported by a forward support assembly forwardly of the mid-length location of the vehicle. Each lamp has an intermediate part supported by an intermediate support assembly between rearward and forward supports. Each lamp is formed of light emitting diodes 70 along its length. Each lamp has a contoured profile for being slidably received and supported by associated second brackets at an angle for illuminating the indicia on the side panels of the vehicle.

The battery 28 in the vehicle is operably coupled to the lamps for illuminating the lamps.

Lastly, the solar panel 30 is provided on top of the vehicle. The solar panel is operably coupled to the lamps with an associated dusk-to-dawn switch and inverter for illuminating the lamps.

Figure 6:
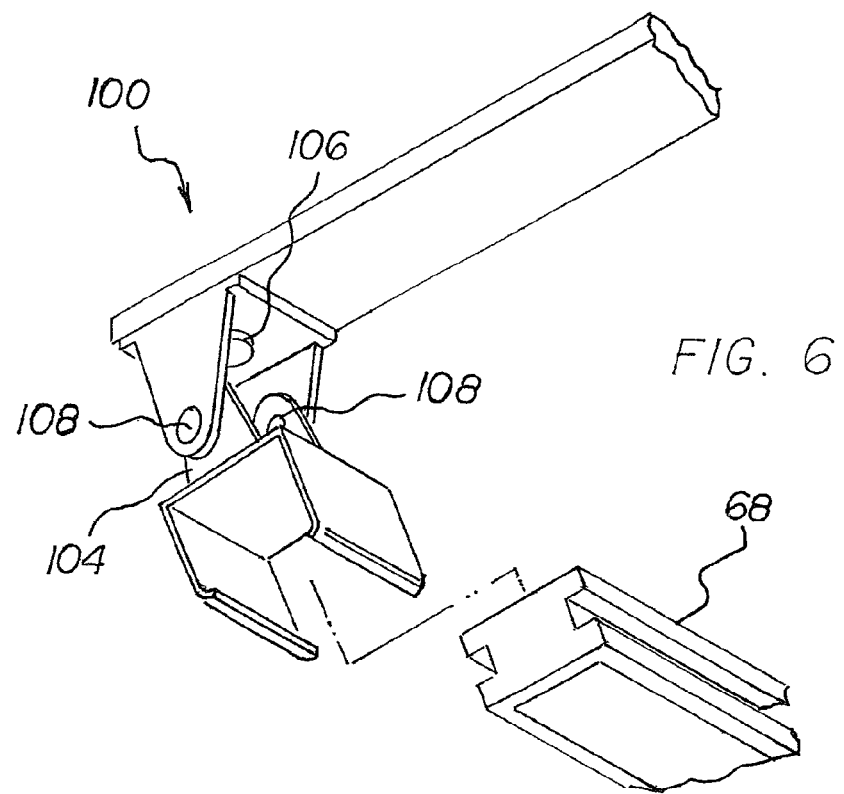
FIG. 6 is a perspective illustration of an alternate embodiment coupling between a support assembly and a lamp.

An alternate embodiment of the invention is shown in FIG. 6. In this embodiment of the system 100 each second bracket 104 includes a vertical attaching pin 106 and axially aligned horizontal pivot pins 108 adapted to vary the angle of a supported lamp with respect to the indicia being illuminated.

The present invention is described herein above as used with a truck. It should be understood, however, that the lighting and support components are readily utilized with vehicles other than trucks such as boats, trailers, or davits. The illumination is operable underwater and is readily capable of providing a target for a boat entering a trailer or a davit or even a dock. Further, the system discloses threaded fasteners for coupling the components of the system. It should be appreciated that other fasteners such as magnets is adapted to be substituted for the threaded fasteners.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A lighting system for a vehicle of the type having an interior and an exterior, the exterior having opposed side panels with indicia thereon, the vehicle also having a top and a front forwardly and a rear rearwardly and a mid-length location, the exterior also having lateral projection on each side of the vehicle adjacent to the top, the system including: a support assembly on each side of the vehicle, each support assembly including a plurality of first brackets interiorly and a plurality of second bracket exteriorly and an intermediate leg between an associated first bracket and second bracket, each intermediate leg having a short vertical extent positioned adjacent to an associated first bracket, each intermediate leg having a long angled extent extending outwardly and downwardly from an associated first bracket, each long angled extent positioned adjacent to an associated second bracket, the first brackets receiving an associated lateral projection, the second brackets receiving and supporting lamps.

2. The system as set forth on claim 1 wherein each bracket is removably attached to an associated intermediate leg.

3. The system as set forth on claim 1, wherein each second bracket includes a vertical attaching pin and axially aligned horizontal pivot pins adapted to vary the angle of a supported lamp with respect to the indicia being illuminated.

4. An ad-night lighting system for illuminating advertising indicia located on the side of a vehicle while driving and while parked and for also illuminating the interior of the vehicle, the illuminating being done in a safe, convenient and economical manner, the system comprising, in combination:

a vehicle having an interior and an exterior, the interior having a storage area with a ceiling, the exterior having two opposed side panels with advertising indicia thereon, the vehicle also having a top and a front forwardly and a rear rearwardly and a mid-length location equally spaced between the front and the rear, the exterior also having lateral projection on each side of the vehicle adjacent to the top and extending forwardly from the rear of the vehicle adjacent to the top to a location forwardly of the mid-length location, a source of electrical potential including a car battery within the vehicle and a solar panel on the top of the vehicle;

three support assemblies on each side of the vehicle, each support assembly including a first bracket interiorly and a second bracket exteriorly and an intermediate leg coupling associated first and second brackets, each intermediate leg having a short vertical extent positioned adjacent to an associated first bracket, each intermediate leg having a long angled extent extending outwardly and downwardly from an associated first bracket at between 10 degrees and 20 degrees from the horizontal; each first bracket having a C-shaped configuration with a horizontal upper segment and a lower segment and an intermediate segment, each first bracket receiving a portion of an associated lateral projection, a first threaded aperture extending through each upper segment with a primary bolt extending through an associated first threaded aperture for separably coupling each support assembly to an associated lateral projection, a second threaded aperture extending through each intermediate segment and associated short extent of the intermediate leg with a secondary bolt extending through each second threaded aperture for separably coupling each intermediate leg to an associated first bracket;

each second bracket having a generally inverted U-shaped configuration with a generally horizontal top segment and parallel lower segments forming a contoured slot, a third threaded aperture extending through each top segment and long extent of the intermediate leg with a tertiary bolt extending through each third threaded aperture and intermediate leg for separably coupling each second bracket to an associated intermediate leg; a lamp positioned on each side of the vehicle, each lamp having an elongated configuration with a rearward part supported by a rearward support assembly adjacent to the rear of the vehicle, each lamp having a forward part supported by a forward support assembly forwardly of the mid-length location of the vehicle, each lamp having an intermediate part supported by an intermediate support assembly between rearward and forward supports, the lamp being formed of light emitting diodes along its length, each lamp having a contoured profile for being slidably received and supported by associated second brackets at an angle for illuminating the indicia on the side panels of the vehicle;

the battery in the vehicle being operatively coupled to the lamps for illuminating the lamps; and the solar panel on top of the vehicle being operably coupled to the lamps with an associated dusk-to-dawn switch and inverter for illuminating the lamps.

\* \* \* \* \*